(12) United States Patent
Jäntti et al.

(10) Patent No.: US 10,528,110 B2
(45) Date of Patent: Jan. 7, 2020

(54) METHOD FOR DIAGNOSING POWER SUPPLY FAILURE IN A WIRELESS COMMUNICATION DEVICE

(71) Applicant: Telefonaktiebolaget LM Ericsson (publ), Stockholm (SE)

(72) Inventors: Joni Jäntti, Oulu (FI); Joakim Andersson, Veberöd (SE); Markus Littow, Oulu (FI); Tarmo Ruotsalainen, Haukipudas (FI); Saila Tammelin, Kiviniemi (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 348 days.

(21) Appl. No.: 15/324,449

(22) PCT Filed: Jul. 9, 2014

(86) PCT No.: PCT/EP2014/064690
§ 371 (c)(1),
(2) Date: Jan. 6, 2017

(87) PCT Pub. No.: WO2016/004986
PCT Pub. Date: Jan. 14, 2016

(65) Prior Publication Data
US 2017/0168537 A1    Jun. 15, 2017

(51) Int. Cl.
*G06F 1/28* (2006.01)
*G06F 11/07* (2006.01)
(Continued)

(52) U.S. Cl.
CPC ............... *G06F 1/28* (2013.01); *G06F 1/30* (2013.01); *G06F 1/3209* (2013.01);
(Continued)

(58) Field of Classification Search
CPC .......... G06F 11/0709; G06F 11/0721; G06F 11/0742; G06F 11/0778; G06F 11/3013;
(Continued)

(56) References Cited

U.S. PATENT DOCUMENTS 5,727,221 A    3/1998    Walsh et al.
6,345,369 B1   2/2002    Kitamorn et al.
(Continued)

FOREIGN PATENT DOCUMENTS

CN    102270030 A    12/2011
CN    203104105 U    7/2013
(Continued)

OTHER PUBLICATIONS

Unknown, Author, "1.2 A Programmable Device Power Supply with Integrated 16-Bit Level Setting DACs", Analog Devices, AD5560, 2008, 1-68.

*Primary Examiner* — Terrell S Johnson
(74) *Attorney, Agent, or Firm* — Murphy, Bilak & Homiller, PLLC (57) ABSTRACT

A method in a wireless communication device for diagnosing power supply failure in the wireless communication device is provided. The wireless communication device detects (301) an indication of power supply failure in the wireless communication device. When the indication of the power supply failure further indicates a non-active state of the wireless communication device or when the wireless communication device enters an error handling mode, the wireless communication device collects (302) diagnostic data from the PMU by means of a diagnostic engine (215) in the PMU. The wireless communication device then stores (303) the collected diagnostic data to a memory in the PMU. The data is related to the event resulting in the non-active state and/or to the latest event in a system of the wireless communication device or when the wireless communication (Continued)

device enters an error handling mode. Otherwise the wireless communication device stores (303) an indication indicating a potential power supply failure to the memory in the PMU. The wireless communication device then diagnoses (307) the power supply failure in the wireless communication device based on the diagnostic data and any one out of: —the data related to the event resulting in the non-active state and/or to the latest event in a system of the wireless communication device or when the wireless communication device enters an error handling mode, and—the indication indicating the potential power supply failure.

13 Claims, 7 Drawing Sheets

(51) Int. Cl.
  *G06F 11/30* (2006.01)
  *G06F 1/30* (2006.01)
  *G06F 1/3209* (2019.01)
(52) U.S. Cl.
  CPC ...... *G06F 11/0709* (2013.01); *G06F 11/0721* (2013.01); *G06F 11/0742* (2013.01); *G06F 11/0778* (2013.01); *G06F 11/3058* (2013.01); *G06F 11/3013* (2013.01)

(58) Field of Classification Search
  CPC .......... G06F 11/3058; G06F 1/28; G06F 1/30; G06F 1/3209
  See application file for complete search history.

(56) References Cited

U.S. PATENT DOCUMENTS

| | | |
|---|---|---|
| 2004/0181708 A1* | 9/2004 | Rothman ............ G06F 11/0748 714/10 |
| 2008/0086649 A1 | 4/2008 | Hublitz et al. |
| 2009/0309745 A1 | 12/2009 | Johnson et al. |
| 2010/0017661 A1 | 1/2010 | Queck |
| 2010/0040124 A1 | 2/2010 | Wurth |
| 2011/0145620 A1* | 6/2011 | Shih ........................ G06F 1/28 713/340 |
| 2013/0007473 A1 | 1/2013 | van der Lee |
| 2013/0318405 A1 | 11/2013 | Korah et al. |

FOREIGN PATENT DOCUMENTS

| | | |
|---|---|---|
| EP | 2369727 A2 | 9/2011 |
| RU | 2486574 C2 | 6/2013 |
| WO | 2002037653 A2 | 5/2002 |

* cited by examiner

METHOD FOR DIAGNOSING POWER SUPPLY FAILURE IN A WIRELESS COMMUNICATION DEVICE

TECHNICAL FIELD

Embodiments herein relate to a wireless communication device, and a method therein. In particular, it relates to diagnosing power supply failure in the wireless communication device.

BACKGROUND

Communication devices such as wireless terminals are also known as e.g. user equipments (UE), mobile terminals, mobile stations and/or wireless communication devices. Wireless communication devices are enabled to communicate wirelessly in a cellular communications network or wireless communication system, sometimes also referred to as a cellular radio system or cellular networks. The communication may be performed e.g. between two wireless communication devices, between a wireless communication device and a regular telephone and/or between a wireless communication devices and a server via a Radio Access Network (RAN) and possibly one or more core networks, comprised within the cellular communications network.

Wireless communication devices may further be referred to as user equipments, mobile telephones, cellular telephones, laptops, tablet computers or surf plates with wireless capability, just to mention some further examples. The wireless communication devices in the present context may be, for example, portable, pocket-storable, hand-held, computer-comprised, or vehicle-mounted mobile devices, enabled to communicate voice and/or data, via the RAN, with another entity, such as another wireless communication devices or a server.

The cellular communications network covers a geographical area which is divided into cell areas, wherein each cell area being served by an access node. A cell is the geographical area where radio coverage is provided by the access node.

Wireless communication devices may comprise wireless baseband modems and application processors which are based on Central Processing Units (CPUs) that can be designed based on a core e.g. from ARM such as CORTEX R5 or A15. Usually CPUs are implemented on Integrated Circuits (IC) called a Digital Baseband (DB) and regulated supply voltages are provided by another IC called a Power Management Unit (PMU) which also is referred to as an Analog Baseband (AB).

CPU crashes i.e. unexpected shutdowns of wireless communication devices are usual during a software development phase. Usually they are due to issues in the software code and there are dedicated tools called debuggers available to trace the source of the issue causing the CPU to either hang or shutdown the wireless communication device.

CPU malfunctions may also be caused by errors in hardware e.g. in one of the ICs or Printed Wiring Boards (PWB/PCB) or there could be errors in the design of the IC or error in the software that controls the IC.

One source for a hardware failure could be that the regulator inside PMU that is supplying power to the CPU fails for some reason, the failure could also be the supply to the oscillator, memory or other vital component of the CPU subsystem. The regulator could be incorrectly configured by the software or the communication from the DB to the PMU could fail or the regulator core may not provide the specified voltage and current supply.

CPU power supply failure can cause several consequences in the wireless communication device and the most usual one is CPU crashes i.e. resetting to initial state, getting stuck, performing unexpected tasks or entering various internal error states. The commonality for all power supply crashes is that software debugger tools are not able to provide the actual reason of the failure instead it provides no reason or a reason that is not the root cause but the consequence of the failure e.g. memory corruption.

Software debugger tools may detect from the CPU dump file which describes the state of the CPU memory and registers at the moment of the failure that there was unexpected shutdown of the PMU. In case of the battery line being under or over voltage it may be relatively easy to trace the source of the error being a faulty battery supply. A PMU internal Watch Dog (WD) expiration can be used to investigate the supply error of the CPU that is running software expected to keep the WD alive.

CPU crashes that are not traceable with software debugger tools need to be investigated in laboratory with measurement equipment like oscilloscope. In order to capture the failure with an oscilloscope it requires being able to access the test points and find the right use case to trigger the failure again.

An unexpected shutdown event in a CPU dump file is often hard to diagnose. For example sometimes battery overvoltage is not caused by a battery failure but e.g. by software that programs PMU settings in such way that the CPU or PMU causes disturbances on the battery line. Also the PMU internal watchdog expiration can be caused by a supply problem of many other devices like memory or general interface (IO) supply voltage failure. It can also happen that the actual unexpected shutdown event is not recorded in the CPU dump file. This is due to fact that there is no system restart because the PMU internal watchdog is intentionally disabled. The watchdog may be kept alive but otherwise CPU is not working well or in worst case the CPU is damaged by the power supply failure.

In early development phase of wireless communication devices it can be relatively easy to capture the CPU power supply failures from the development boards with measurement equipment like oscilloscopes but it is always time consuming and cumbersome. Later in the product development cycle it may be impossible to capture the failure if it happens in the customer device and occurrence is low or conditions cannot be reproduced in laboratory.

SUMMARY

It is therefore an object of embodiments herein to provide an improved and integrated power supply diagnostic system for a wireless communication device.

According to a first aspect of embodiments herein, the object is achieved by a method in a wireless communication device for diagnosing power supply failure in the wireless communication device. The wireless communication device comprises a Power Management Unit, PMU. The wireless communication device detects an indication of power supply failure in the wireless communication device. When the indication of the power supply failure further indicates a non-active state of the wireless communication device or when the wireless communication device enters an error handling mode, the wireless communication device collects diagnostic data from the PMU by means of a diagnostic engine in the PMU. The diagnostic engine then stores the collected diagnostic data to a memory in the PMU. The data is related to an event resulting in the non-active state and/or to a latest event in a system of the wireless communication device or when the wireless communication device enters an error handling mode. Otherwise the diagnostic engine stores an indication indicating a potential power supply failure to the memory in the PMU. The wireless communication device then diagnoses the power supply failure in the wireless communication device based on the diagnostic data and any one out of:

the data related to the event resulting in the non-active state and/or to the latest event in a system of the wireless communication device or when the wireless communication device enters an error handling mode, and the indication indicating the potential power supply failure.

According to a second aspect of embodiments herein, the object is achieved by a wireless communication device for diagnosing power supply failure in the wireless communication device. The wireless communication device comprises a Power Management Unit, PMU. The wireless communication device comprises means adapted to detect an indication of power supply failure in the wireless communication device. The wireless communication device further comprises means adapted to collect diagnostic data from the PMU by means of a diagnostic engine in the PMU, when the indication of the power supply failure further indicates a non-active state of the wireless communication device or when the wireless communication device enters an error handling mode. The wireless communication device further comprises means adapted to store the collected diagnostic data to a memory in the PMU. The diagnostic engine further comprises means adapted to store data in the memory of the PMU, when the indication of the power supply failure further indicates a non-active state of the wireless communication device, which data is related to an event resulting in the non-active state and/or to a latest event in a system of the wireless communication device or when the wireless communication device enters an error handling mode; otherwise store an indication indicating a potential power supply failure to the memory in the PMU. The wireless communication device further comprises means adapted to diagnose the power supply failure in the wireless communication device based on the diagnostic data and any one out of:

the data related to the event resulting in the non-active state and/or to the latest event in a system of the wireless communication device or when the wireless communication device enters an error handling mode, and the indication indicating a potential power supply failure.

Since the wireless communication device collects diagnostic data from the PMU by means of a diagnostic engine in the PMU at detection of an indication of a power supply failure a correct diagnosis of the reason of the power supply failure is established. In this way an efficient power supply diagnostic system for a wireless communications device is provided.

An advantage with embodiments herein is that the provided diagnosis is done autonomously by the wireless communication device which is a considerable improvement of current diagnostic systems for wireless communication devices since the embodiments herein reduce time for debugging and testing in production as well as reducing the overall returns of wireless communication devices.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed.

A wireless communication device may comprise an application processor and a wireless baseband modem. Recently there has been trend to reuse these subsystems i.e. the application processor and the wireless baseband modem in other consumer products such as TVs, internet access points, cars and many others.

During the development phase of wireless communication devices CPU crashes are frequent and solving each of them in laboratory with measurement equipment consumes resources from test, software, hardware and IC teams. Getting the PMU diagnostic file of the crash would possibly give enough information to avoid laboratory measurement completely. Thus some of the crash analysis performed could be omitted due to the fact that the PMU diagnostic file clearly points to a known issue.

During product qualification in third party or customer laboratory or during field test, it is sometimes impossible to connect measurement equipment for failure analysis. Repeating the failure in another laboratory can be very time consuming or even impossible.

Embodiments herein will give significant advantage by providing diagnosis data of the power supply failure immediately. The error analysis and fixing time during product qualification is crucial.

The embodiments bring advantages for product development, product qualification and customer support of these wireless communication devices. If power supply failures are occurring when a consumer is using the wireless communication device, the embodiments will help in providing diagnostics data for the repair team but also give feedback to product development to improve the product and reduce the overall returns of wireless communication devices.

Figure 1:
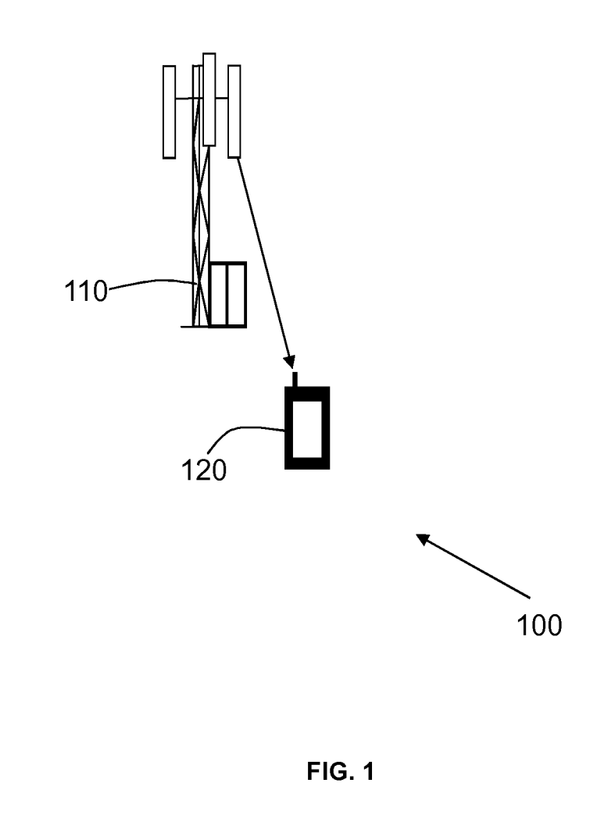
FIG. 1 is a schematic block diagram illustrating embodiments of a wireless communications network.

FIG. 1 depicts an example of a wireless communications network 100 according to an example scenario in which embodiments herein may be implemented. The wireless communications network 100 is a wireless communication network such as an LTE, WCDMA, GSM network, any 3GPP cellular network, Wimax, or any cellular network or system.

The wireless communications network 100 comprises a plurality of network nodes whereof one, a network node 110 is depicted in FIG. 1. The network node 110 may be a transmission point such as a radio base station, for example an eNB, an eNodeB, or an Home Node B, an Home eNode B or any other network node capable to serve a wireless communication device such as a user equipment or a machine type communication device in a wireless communications network.

A wireless communication device 120 operates in the wireless communications network 100. The wireless communication device 120 may e.g. be a user equipment, a wireless communication device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term wireless communication device used in this document also covers other wireless devices such as Machine to machine (M2M) devices.

Figure 2:
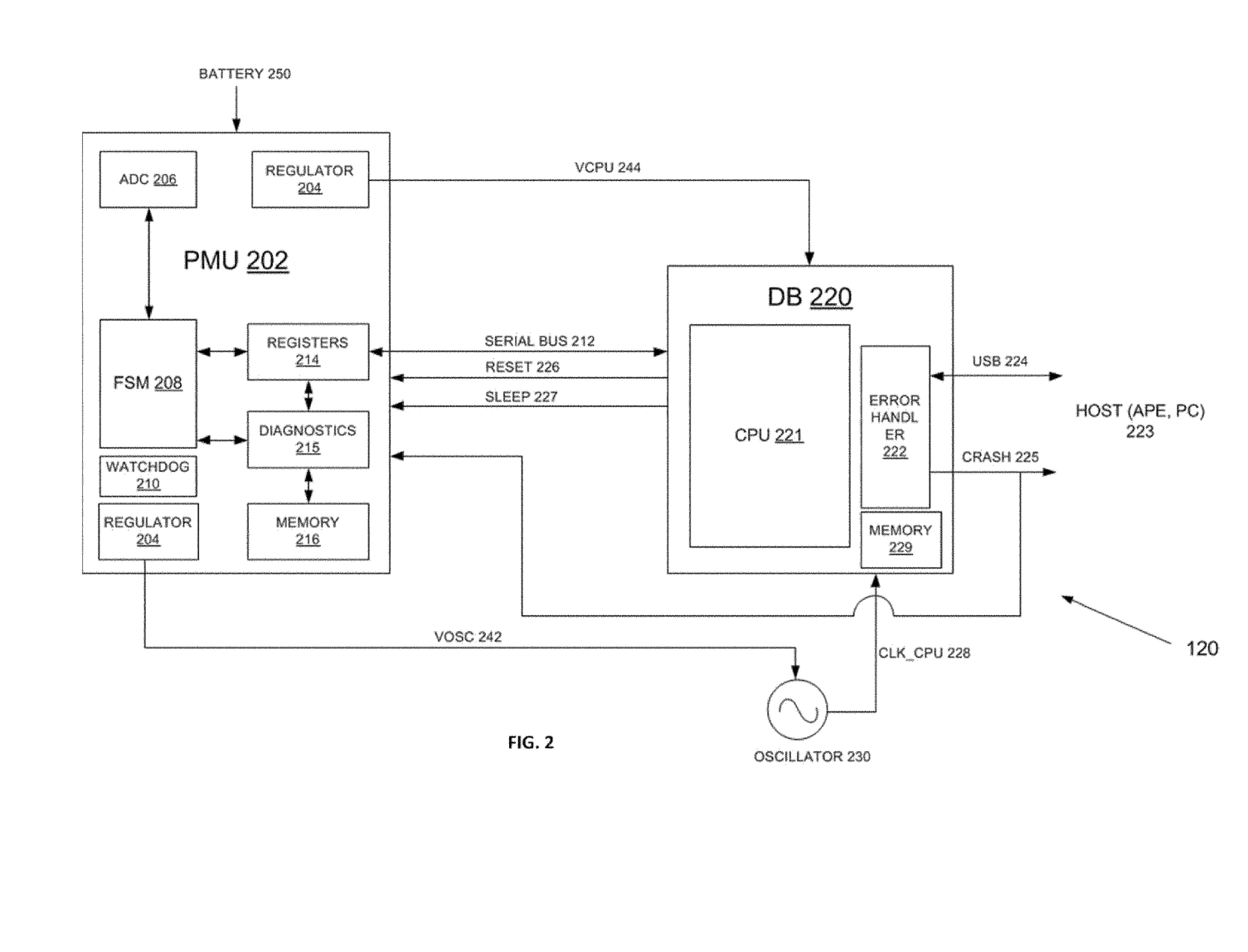
FIG. 2 is a schematic block diagram illustrating embodiments of a wireless communication device.

FIG. 2 depicts the wireless communication device 120 according to an example in which embodiments herein may be implemented. The wireless communication device 120 comprises a PMU 202. The PMU 202 comprises multiple voltage regulators 204, an Analog-to-Digital Converter (ADC) 206, a Finite State Machine (FSM) 208, a watchdog (WD) 210, a serial bus interface 212 and related registers 214. Furthermore, according to embodiments herein, a diagnostics logic 215 (referred to herein as the diagnostic engine 215) and a memory 216 are added to store any diagnostic results.

The wireless communication device 120 further comprises a Digital Baseband (DB) 220. The DB 220 may comprises one or several CPUs 221 and Digital Signal Processors (DSPs) but to simplify the figure only one CPU 221 and one error handler 222 is illustrated. The error handler 222 is controlled e.g. started by the CPU 221 when the CPU detects a fatal error such as corrupted memory or register read or write and cannot continue normal operation. The error handler 222 comprises an additional routine library which contains a routine to start the diagnostics logic 215 in the PMU 202 which returns diagnostics data to the error handler 222. The error handler 222 then passes the returned diagnostics data to a data dump handler service (not shown) that appends the data to a regular CPU log dump file along with other data. Other data may in this context comprise history or previous successful PMU diagnosis data. The wireless communication device 120 may be connected to a Host 223 such as an Application Processing Engine (APE) or a PC via bus interface e.g. a USB 224 which receives the dump file from the error handler 222 in the DB 220 after receiving an indication of the available log dump file via a Crash signal 225. The CPU 221 controls the PMU 202 through the serial bus interface 212 e.g. an I2C, and via direct hardware signals e.g. RESET 226 and SLEEP 227. A clock source, CLK_CPU 228, for the CPU 221 may be an external crystal and voltage supply for the crystal, VOSC 242, may be provided through the PMU voltage regulator 204. The wireless communication device 120 further comprises an oscillator 230. As mentioned above, the PMU 202 comprises multiple voltage regulators 204. However shown in FIG. 2 are only regulators 204, the Voltage Oscillator (VOSC) 242 for the oscillator 230 and Voltage CPU (VCPU) 244 for the DB 220. The wireless communication device is powered by a battery 250 connected to the PMU 202.

In case of a suspected CPU power supply failure the diagnostic engine 215 in the PMU 202 is activated to measure and analyze the state of the PMU 202 and store the data into the embedded memory 216 of the PMU 202. There may be multiple indicators for the CPU power supply failure wherein the indication of the power supply failure in the wireless communication device 120 is detected by monitoring serial bus traffic to the PMU 202, control signals to the PMU 202 not following the expected pattern, PMU supply voltage, digital IO supply, PMU regulator output voltages and currents, PMU temperature, wireless communication device temperature and CPU response time to PMU requests if they exceed a respective programmed threshold whereby the diagnostics engine 215 is activated. Further indicators could be reasons such as too long silence on the communication channel for example serial bus I2C (Inter Integrated Circuit Communications)/SPI (Serial-Peripheral interface), signal from the CPU 221 stuck to a value for too long time for example reset or I2C line or regulated supply output towards CPU out of the meaningful range.

As mentioned the indication for the CPU power supply failure may be for example a watchdog expiration by e.g. the watchdog 210. The diagnostics engine 215 would then store PMU configuration register values such as regulator target output voltages, pin states such as reset pin from user or host, use the ADC 206 to measure temperature, battery voltage and regulator output voltages and store these values into the embedded memory 216 in the PMU 202.

The embedded memory 216 in the PMU 202 may be volatile such as e.g. SRAM or non-volatile e.g. flash memory having the difference that the latter is not erased even when the power supply of the PMU 202 is removed for some reason. Volatile memory however needs to have support from the CPU 221 to read the stored data after an unexpected restart is detected and store it to the system's non-volatile memory. The non-volatile memory may be analyzed after the wireless communication device 120 has been sent to service for analysis and repair.

Hence according to embodiments herein a diagnosis engine 215 is added to the PMU 202. In case of a suspected system crash detection, the internal state of the PMU 202, the relevant registers 214 of the PMU 202 and/or the latest communication content from the host side 223 i.e. the DB 220 or any other relevant information may be stored to an PMU-internal embedded memory 216. This information which is also called de-bug information may then be read out through specific de-bug interfaces or through normal host interfaces when the system of the wireless communication device 120 is started again.

Example of embodiments of a method in the wireless communication device 120 for diagnosing power supply failure in the wireless communication device 120 will now be described with reference to a flowchart depicted in FIGS. 3, 4a, 4b and 5. As mentioned above, the wireless communication device 120 comprises the PMU 202. In some embodiments the wireless communication device 120 further comprises the CPU 221. The method comprises the following actions, which actions may be taken in any suitable order.

Figure 3:
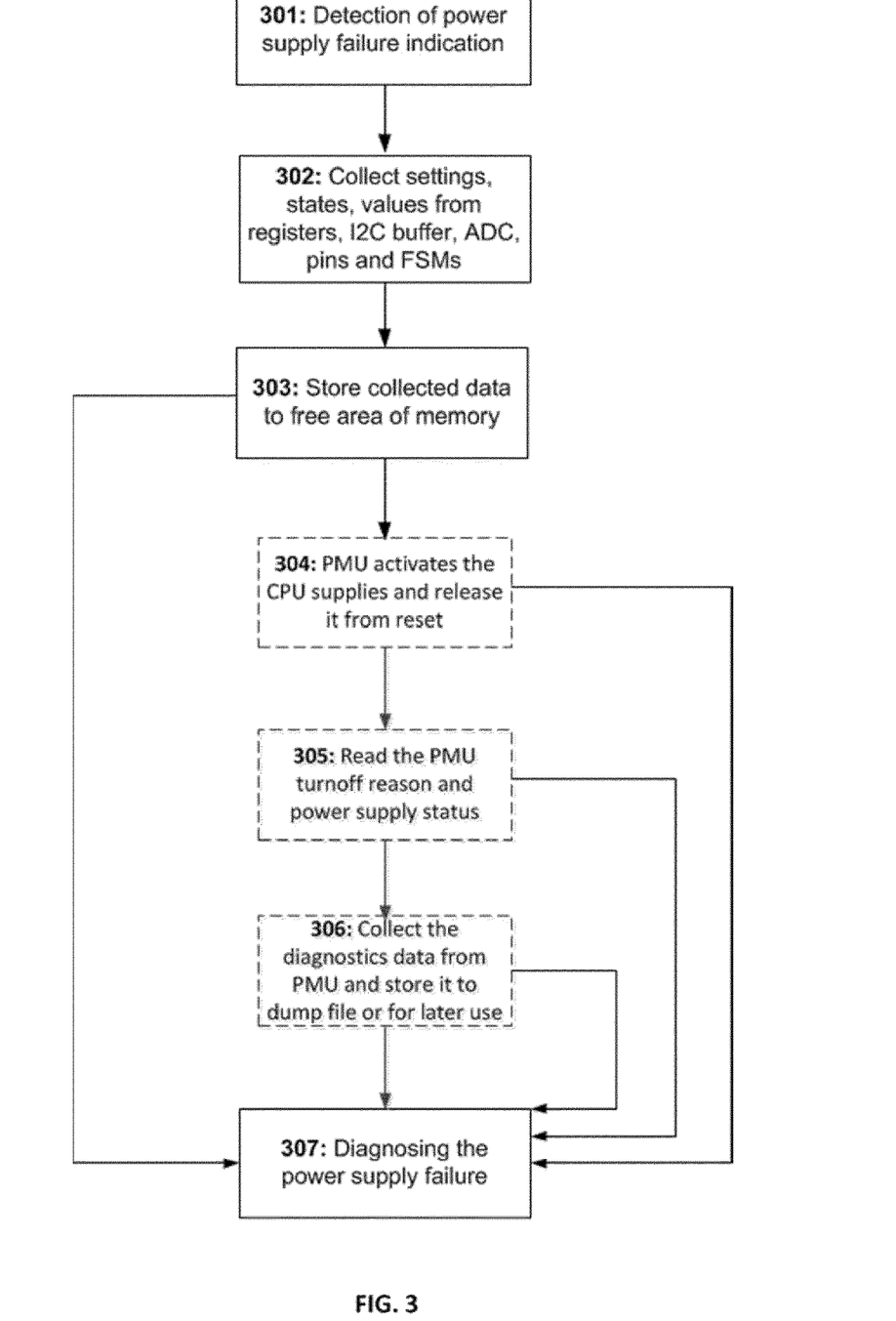
FIG. 3 is a flowchart depicting embodiments of a method for detecting and diagnosing power supply failure in a wireless communication device.

FIG. 3 depicts a method of an example embodiment. The boxes in FIG. 3 with dashed lines indicate non-mandatory or optional actions.

Action 301

The wireless communication device 120, such as e.g. the diagnostic engine 215 of the PMU 202, detects an indication of power supply failure in the wireless communication device 120. This may e.g. be because the wireless communication device 120 crashes meaning terminates abnormally and the wireless communication device 120 unexpectedly shuts down.

In some embodiments the indication of the power supply failure further indicates a non-active state of the wireless communication device 120 or an error handling mode of the wireless communication device 120. This indication may be useful information for later on diagnosis purposes described below. A non-active state is a state which occurs when the wireless communication device has shut down and is not operational. An error handling mode is a mode which occurs when in a failed CPU operation, for example such as corrupted memory or register read or write, the CPU 221 starts an error handler service in the error handler 222. An additional error handler routine library in the error handler 222 comprises a routine to start the diagnostics logics in the diagnostic engine 215 in the PMU 202 which returns PMU diagnostics data to the error handler 222. The error handler 222 then passes the returned data to data dump handler service that writes PMU diagnostics data to a dump file along with other collected dump file data.

In some embodiments the indication of the power supply failure in the wireless communication device 120 is detected by monitoring any of out of serial bus traffic to the PMU, control signals to the PMU not following the expected pattern, PMU supply voltage, digital IO supply, PMU regulator output voltages and currents, PMU temperature, wireless communication device temperature and CPU response time to PMU requests to see if they exceed a respective programmed threshold whereby a diagnostics engine is activated.

The error handling mode may be indicated to the PMU 202 with a dedicated signal or command through a serial bus interface such as e.g. I2C or SPI.

Action 302

When the diagnostic engine 215 of the PMU 202 in the wireless communication device 120 has detected the indication of the power supply failure, it may further indicate either a non-active state of the wireless communication device 120 or when the wireless communication device 120 enters an error handling mode.

In both cases, the wireless communication device 120 collects diagnostic data from the PMU 202 by means of a diagnostic engine 215 in the PMU.

In some embodiments the diagnostic engine 215 is configured to capture and store only a subset of all diagnostic data to be able to store a maximum amount of data to the embedded memory 216 of the PMU 202. This is an advantage in some embodiments where actual moment where multiple sets of diagnostic data are stored before it is being fetched by the CPU for analysis.

The diagnostic engine 215 may further be configured to store the diagnostic data at programmable interval of time e.g. if the power supply failure indication cannot be detected otherwise. In case of an unknown failure, the diagnostics data may be collected from the PMU 202 in order to identify the initial, intermediate and latest states. In order to provide even more debugging features the diagnostics may be configured to trigger to certain accessed serial bus addresses or hardware pin events to collect and store the diagnostics data at that moment in time. More specifically, the diagnostic engine 215 may be configured to store the diagnostic data with a command given through a serial bus interface 226 or dedicated hardware signals 226, 227. The diagnostic engine 215 may also be configured to collect diagnostic data from different sources within the PMU 202; current and past diagnostic data written through the serial bus interface, states of the hardware signals interfacing with the PMU 202, measured PMU temperature, measured input voltage of the PMU, measured regulator output voltages and currents, state of a Finite State Machine 208 controlling the PMU 202 and measured PMU reference voltages and currents.

Action 303

The wireless communication device 120 stores the collected diagnostic data to a memory 216 in the PMU 202. This may be performed by initiating a data collection procedure in which the relevant register settings or all register settings; recent I2C accesses; ADC measurement of critical nodes such as battery, bandgap, references, regulator outputs; pin statuses such as RESET 226, SLEEP 227; internal FSM states and real-time are collected which also may be referred to as fetched and stored into the memory 216 which is an embedded memory of the PMU 202. Moreover the time period for how long the indication was active may be stored to distinguish glitches from permanent state incidents e.g. duration of over-voltage on battery line. If the embedded memory 216 in the PMU 202 is large enough it may be organized so that multiple sets of diagnostic data can be stored into that. If the embedded memory 216 in the PMU 202 is of volatile type such as SRAM, it preferably keeps its state until the final supply voltage is removed from the PMU 202 e.g. the battery or the back-up battery. The collected and stored data is related to the event resulting in the non-active state and/or to a latest event in a system of the wireless communication device 120 or when the wireless communication device enters an error handling mode. E.g. if the power supply failure indication was a turnoff event, the PMU 202 may store the turnoff reason and the status into registers and turn of the wireless communication device 120. Otherwise the wireless communication device 120 stores an indication indicating a potential power supply failure to the memory 216 in the PMU. This may be performed even when the power supply failure indication did not comprise a turnoff reason. Further, it may store a flag indicating the incident and continue its normal operation of the wireless communication device 120.

In some embodiments the diagnostic data is stored in the memory 216 of the PMU together with other data relating to earlier collected data during boot of the wireless communication device 120. The earlier data is collected and stored to a main/system memory 229 of the wireless communication device 120.

Action 304

When the wireless communication device 120 is turned on, the PMU 202 activates the CPU 221 e.g. by activating the power supplies and releases it from reset. The CPU 221 then starts and runs the initial software to set-up the system in the wireless communication device 120.

Action 305

In some embodiments, when the CPU 221 in the wireless communication device 120 is activated, the wireless communication device 120 reads the data related to the event resulting in the non-active state from the stored data in the memory of the PMU. This may e.g. be performed by specifically checking the status registers during the set-up phase of the system in the wireless communication device 120.

The diagnostic data may be read when the CPU 221 in the wireless communication device 120 is in a debug mode using a debug interface. The debug mode is a mode wherein the wireless communication device 120 is not in a state to transmit data but waits for a service cable to be connected to it and then communicate through the service cable e.g. a USB through which the wireless communication device should dump the log data out from. In the testing and production phase of the wireless communication device 120 this interface could be the most appropriate and most useful interface to be used.

The diagnostic data may further be read via an external reader through a service interface like JTAG. This may take place in a consumer end product service. In the consumer end product phase of the wireless communication device 120 this interface is the most appropriate and useful interface to be used.

Action 306

In a first example embodiment the wireless communication device 120 determines if the non-active state was unexpected and if so the wireless communication device 120 collects the diagnostic data from the PMU and storing it in the central memory 229 of the wireless communication device. More specifically this may be done during the set-up phase of the system in the wireless communication device 120 wherein the software running on the CPU 221 checks the status registers of the PMU 202 and if the turnoff event was unexpected it enters an error handling mode which is a mode wherein the CPU 221 in the wireless communication device 120 stops working normally and prepares a log dump and shutdowns or restarts, collects the diagnostic data from the PMU 202 which provides a dump file through the debug interface which may be such as USB 224, UART or any removable mass memory.

In a second example embodiment the wireless communication device 120 determines if the non-active state was expected and if so collects the diagnostic data from the PMU and stores it for later diagnosis. More specifically this may be done if the software detects, during boot or normal operation of the wireless communication device 120, a flag from the PMU 202 indicating that there was a potential power supply failure and thereby it collects the relevant data and stores it for later use in the embedded memory 216 of the PMU 202. If the CPU 221 enters into an error handling mode later on, it may fetch the most relevant diagnostics data from the PMU 202 and also it may attach the PMU diagnostic data collected during boot of the wireless communication device 120 to a dump file since it may reveal the origin of the CPU error state.

Action 307

The wireless communication device 120 then diagnoses the power supply failure in the wireless communication device 120 based on the diagnostic data and any one out of:
  the data related to the event resulting in the non-active state and/or to the latest event in a system of the wireless communication device and/or the wireless communication device enters the error handling mode, and
  the indication indicating the potential power supply failure.

One example scenario for an error to be diagnosed may be a software error that writes a configuration making the regulator 204 providing supply for an oscillator such as VOSC 242 or memory to turn off or provide too low voltage or current. Without clock, the CPU 221 becomes completely handicapped without being able to write out a useful dump file for debugging. However, with the example embodiments of the method described herein, the state of the VOSC regulator 204 would be written to the internal embedded memory 216 of the PMU 202 when the PMU 202 internal watchdog expires. At next boot of the wireless communication device 120, the CPU 221 would see the unexpected turnoff reason, fetch the relevant diagnostics data and store it to a dump file for debugging. By inspecting the diagnostics data of the PMU 202 in the dump file, the incorrect VOSC configuration would be revealed and debugging with oscilloscope would not be needed.

The text below relates to any suitable embodiment above.

Figure 4A:
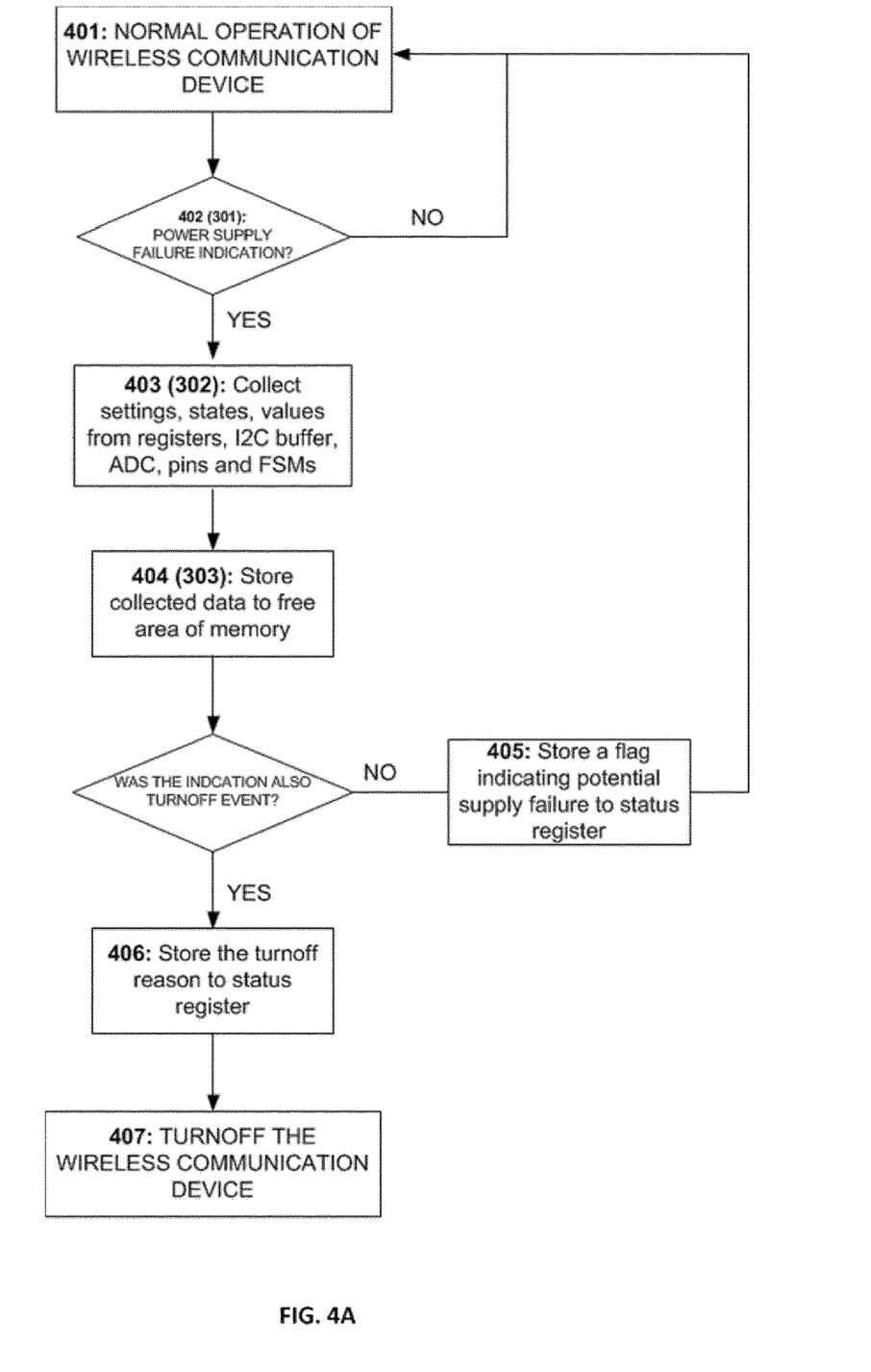
FIG. 4a is a flowchart depicting embodiments of a method for storing parameters in a wireless communication device.
Figure 4B:
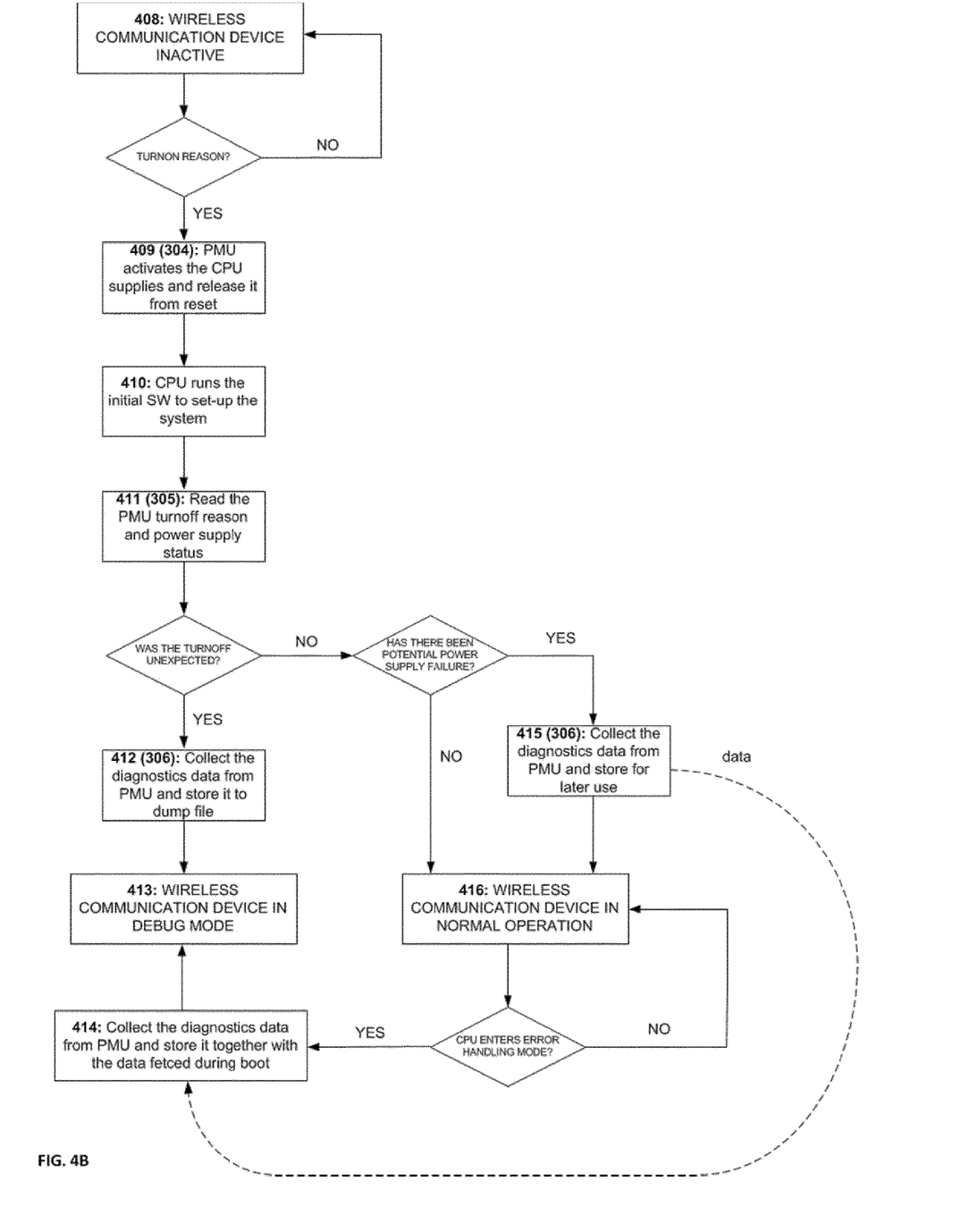
FIG. 4b is a flowchart depicting embodiments of a method for reading parameters in a wireless communication device.

FIG. 4a continuing into FIG. 4b depicts a method of an example embodiment. FIG. 4a actions 401-407 relate to storing parameters in the wireless communication device 120, and FIG. 4b actions 408-416 relate to reading parameters in the wireless communication device 120.

Action 401. The wireless communication device 120 operates in a normal mode.

Action 402. The wireless communication device 120 then detects a power supply failure in the wireless communication device 120. This action relates to action 301 above.

Action 403. When the power supply failure is detected the wireless communication device 120 collects diagnostic data from the PMU 202 in the wireless communication device 120. This action relates to action 302 above.

Action 404. The wireless communication device 120 stores the collected diagnostic data in a memory 216 of the PMU 202 in the wireless communication device 120. This action relates to action 303 above.

Action 405. The wireless communication device 120 determines if the indication of the power supply failure comprises a turnoff event of the wireless communication device 120. If no, then a flag indicating a potential supply failure is stored in the status registers 214 of the PMU 202 of the wireless communication device 120. The wireless communication device 120 may then return to action 401.

Action 406. This action is an alternative to action 405. The wireless communication device 120 determines if the indication of the power supply failure comprises a turnoff event of the wireless communication device 120. If yes, then a turnoff reason to the turnoff event of the wireless communication device 120 is stored in the status registers 214 of the PMU 202 of the wireless communication device 120.

Action 407. If comprising a turnoff event of the wireless communication device 120 as in action 406 the wireless communication device 120 is turned off and is no longer operational.

Action 408. Now, over to FIG. 4b relating to the reading parameters in the wireless communication device 120. The wireless communication device 120 is inactive and is not operational.

Action 409. The wireless communication device 120 is at a turnon reason operational again by means of the PMU 202 which activates the CPU 221 and releases it from reset. This action relates to action 304 above.

Action 410. The CPU 221 in the wireless communication device 120 runs the initial software and sets up the system in the wireless communication device 120.

Action 411. The wireless communication device 120 then reads the turnoff reason and the power supply status of the wireless communication device 120. This action relates to action 305 above.

Action 412. The wireless communication device 120 determines if the turnoff event of the wireless communication device 120 was expected. If yes, the turnoff event was expected, the actions 412-414 are taken. If yes, then the PMU 202 collects diagnostic data from the PMU 202 in the wireless communication device 120 and stores it to a dump file. This action relates to action 306 above.

Action 413. The wireless communication device 120 operates in a debug mode.

Action 414. The wireless communication device 120 enters the error handling mode and collects diagnostic data from the PMU 202 in the wireless communication device 120 and stores it to a dump file together with other data collected during boot of the wireless communication device 120.

Action 415. The wireless communication device 120 determines if the turnoff event of the wireless communication device 120 was expected. If no, the turnoff event was expected, the actions 415-416 are taken. If no, then the wireless communication device 120 further determines if there is a flag for a potential power supply failure stored. If yes, a flag for a potential power supply failure is stored, then the PMU 202 collects diagnostic data from the PMU 202 in the wireless communication device 120 and stores it for later use. This action relates to action 306 above.

Action 416. The wireless communication device 120 determines if the turnoff event of the wireless communication device 120 was expected. If no, no flag for a potential power supply failure is stored, then the wireless communication device 120 further determines if there is a flag for a potential power supply failure stored. If no, then the wireless communication device 120 operates in a normal mode.

Figure 5:
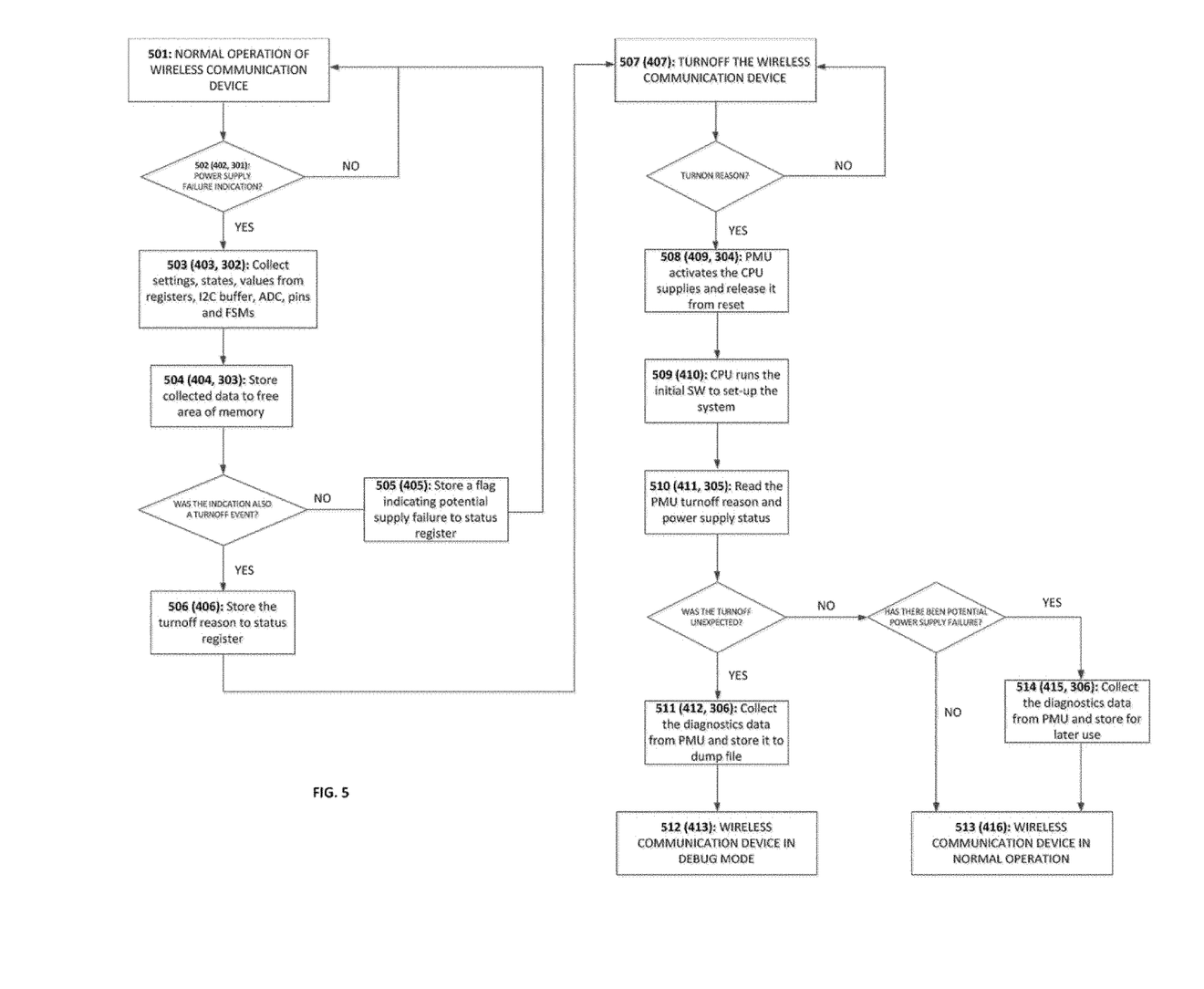
FIG. 5 is a flowchart depicting embodiments of a method for storing and reading parameters in a wireless communication device.

FIG. 5 depicts a method of another example embodiment. FIG. 5 relates to storing and reading parameters in the wireless communication device 120.

Action 501. In this action the wireless communication device 120 operates in a normal mode.

Action 502. The wireless communication device 120 then detects a power supply failure in the wireless communication device 120. This action relates to actions 402 and 301 above.

Action 503. When detecting the power supply failure, the wireless communication device 120 collects diagnostic data from the PMU 202 in the wireless communication device 120. This action relates to actions 403 and 302 above.

Action 504. The wireless communication device 120 stores the collected diagnostic data in a memory 216 of the PMU 202 in the wireless communication device 120. This action relates to actions 404 and 303 above.

Action 505. The wireless communication device 120 determines if the indication of the power supply failure comprises a turnoff event of the wireless communication device 120. If no, then a flag indicating a potential supply failure is stored in the status registers 214 of the PMU 202 of the wireless communication device 120. This action relates to action 405 above. The wireless communication device 120 may then return to action 501.

Action 506. This action is an alternative to action 505. The wireless communication device 120 determines if the indication of the power supply failure comprises a turnoff event of the wireless communication device 120. If yes, then a turnoff reason to the turnoff event of the wireless communication device 120 is stored in the status registers 214 of the PMU 202 of the wireless communication device 120. This action relates to action 406 above.

Action 507. The wireless communication device 120 is turned off and is no longer operational. This action relates to action 407 above.

Action 508. The wireless communication device 120 is at a turnon reason operational again by means of the PMU 202 which activates the CPU 221 and releases it from reset. This action relates to actions 409 and 304 above.

Action 509. The CPU 221 in the wireless communication device 120 runs the initial software and sets up the system in the wireless communication device 120. This action relates to action 410 above.

Action 510. The wireless communication device 120 reads the turnoff reason and the power supply status of the wireless communication device 120. This action relates to actions 411 an 305 above.

Action 511. The wireless communication device 120 determines if the turnoff event of the wireless communication device 120 was expected. If yes, the turnoff event was expected and the actions 511-512 are taken. If yes, then the PMU 202 collects diagnostic data from the PMU 202 in the wireless communication device 120 and stores it to a dump file. This action relates to actions 412 and 306 above.

Action 512. The wireless communication device 120 operates in a debug mode i.e. an error handling mode. This action relates to action 413 above.

Action 513. The wireless communication device 120 determines if the turnoff event of the wireless communication device 120 was expected. If no, the turnoff event was not expected and the actions 513-514 are taken. If no, then the wireless communication device 120 further determines if there is a flag for a potential power supply failure stored. If no, no flag for a potential power supply failure has been stored, then the wireless communication device 120 operates in a normal mode. This action relates to action 416 above.

Action 514. This action is an alternative to action 513. The wireless communication device 120 determines if the turnoff event of the wireless communication device 120 was expected. If no, then the wireless communication device 120 further determines if there is a flag for a potential power supply failure stored. If yes, a flag for a potential power supply failure has been stored, then the PMU 202 collects diagnostic data from the PMU 202 in the wireless communication device 120 and stores it in a main/system memory 229 inside the DB 220 or external memory on a PCB for later use. This action relates to actions 415 and 306 above.

Figure 6:
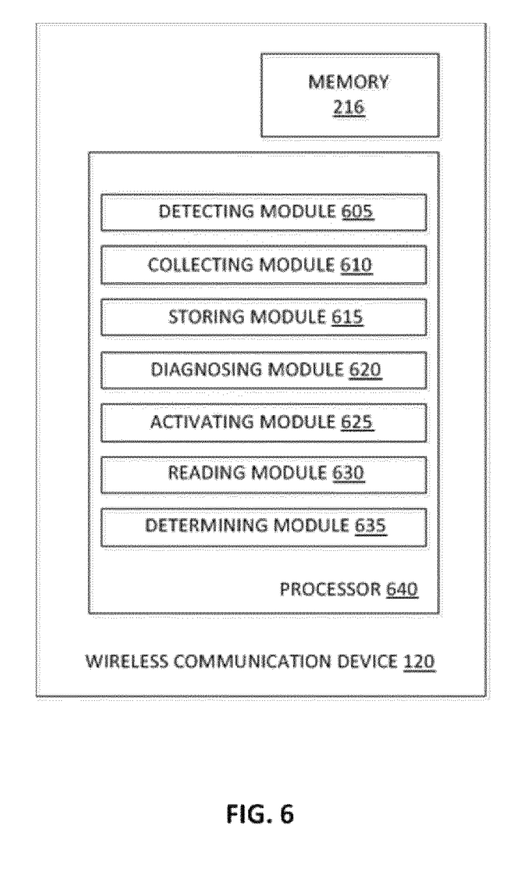
FIG. 6 is a schematic block diagram illustrating embodiments of a wireless communication device.

To perform the method actions for diagnosing power supply failure in the wireless communication device 120 described above in relation to FIGS. 3, 4a, 4b and 5, the wireless communication device 120 may comprise the following arrangement as depicted in FIG. 6. As mentioned above, the wireless communication device 120 comprises the PMU 202. The wireless communication device 120 may also comprise a CPU 221.

The wireless communication device 120, comprises means, such as e.g. a detecting module 605, adapted to detect an indication of power supply failure in the wireless communication device 120.

The wireless communication device 120, further comprises means, such as e.g. a collecting module 610, adapted to collect diagnostic data from the PMU by means of a diagnostic engine in the PMU when the indication of the power supply failure further indicates a non-active state of the wireless communication device or when the wireless communication device enters an error handling mode.

The wireless communication device 120, further comprises means, such as e.g. a storing module 615 adapted to store the collected diagnostic data to a memory 216 in the PMU. The storing module 615 is further adapted to store data in the memory of the PMU, when the indication of the power supply failure further indicates a non-active state of the wireless communication device, which data is related to an event resulting in the non-active state and/or to a latest event in a system of the wireless communication device or when the wireless communication device enters an error handling mode; otherwise to store an indication indicating a potential power supply failure to the memory in the PMU.

The wireless communication device 120 further comprises means, such as e.g. a diagnosing module 620 also referred to as the diagnosis engine 215, adapted to:
- diagnose the power supply failure in the wireless communication device based on the diagnostic data and any one out of:
  - the data related to the event resulting in the non-active state and/or to the latest event in a system of the wireless communication device or when the wireless communication device enters an error handling mode, and
  - the indication indicating a potential power supply failure.

In some embodiments the indication of the power supply failure is to indicate a non-active state of the wireless communication device 120. In these embodiments data related to the event resulting in the non-active state is to be stored in the memory 216 of the PMU 202. In these embodiments the wireless communication device 120 further comprises the CPU 221. In these embodiments the wireless communication device 120 further comprises means such as e.g. an activating module 625 adapted to activate the CPU 221 and release it from reset.

Further in these embodiments, the wireless communication device 120 comprises means such as e.g. a reading module 630 adapted to, when the CPU in the wireless communication device is activated, read the data related to the event resulting in the non-active state from the stored data in the memory of the PMU 202.

In a first alternative of these embodiments, the wireless communication device 120 comprises means such as e.g. a determining module 635 adapted to determine if the non-active state was unexpected and if so collect the diagnostic data from the PMU 202 and store it to a dump file in the wireless communication device 120.

In a second alternative of these embodiments the wireless communication device 120 further comprises means such as e.g. the determining module 635 adapted to determine if the non-active state was expected and if so collect the diagnostic data from the PMU and store it for later diagnosis.

The wireless communication device 120 comprises means such as e.g. the storing module 615 adapted to store the diagnostic data in the memory 216 of the PMU together with other data relating to earlier collected data during boot. The earlier data is collected and stored to a main/system memory 229 of the wireless communication device 120.

The wireless communication device 120 comprises means such as e.g. the detecting module 605 adapted to detect the indication of the power supply failure in the wireless communication device 120 by monitoring serial bus traffic to the PMU, control signals to the PMU 202 not following the expected pattern, PMU supply voltage, digital IO supply, PMU regulator 204 output voltages and currents, PMU temperature, wireless communication device temperature and CPU response time to PMU requests if they exceed a respective programmed threshold whereby the diagnosing module 620 such as the diagnostics engine is activated.

The wireless communication device 120 comprises means such as e.g. an indicating module 640 adapted to indicate the error handling mode to the PMU with a dedicated signal or command through a serial bus interface.

The wireless communication device 120 comprises means such as e.g. the reading module 630 adapted to read the diagnostic data when the CPU 221 in the wireless communication device 120 is in a debug mode by using a debug interface.

The wireless communication device 120 comprises means such as e.g. the reading module 630 adapted to read the diagnostic data via an external reader through a service interface.

The wireless communication device 120 comprises means such as e.g. the diagnostic engine 215 which is configured to store the diagnostic data at programmable interval.

The wireless communication device 120 comprises means such as e.g. the diagnostic engine 215 which is configured to capture and store only a subset of all diagnostic data.

The wireless communication device 120 comprises means such as e.g. the diagnostic engine 215 which is configured to store the diagnostic data with a command given through a serial bus interface 226 or dedicated hardware signals 226, 227. The diagnostic engine 215 may be further configured to collect diagnostic data from different sources within the PMU 202; current and past diagnostic data written through the serial bus interface, states of the hardware signals interfacing with the PMU, measured PMU temperature, measured input voltage of the PMU, measured regulator output voltages and currents, state of a Finite State Machine 208 controlling the PMU and measured PMU reference voltages and currents.

The wireless communication device 120 comprises means such as e.g. the PMU 202 and the CPU 221, implemented in a digital baseband, DB 220. The DB 220 may further contain several CPUs. The wireless communication device may further comprise any one out of:
- multiple voltage regulators in the PMU,
- analog-to-digital converter (ADC),
- finite state machine (FSM),
- watchdog and related serial interface and related registers.

The embodiments herein for a wireless communication device may be implemented through one or more processors, for example a processor 640 as depicted in FIG. 6, together with computer program code for performing the functions and actions of the embodiments herein. The processor 640 may e.g. comprise the detecting module 605, the collecting module 610, the storing module 615, the diagnosing module 620, the activating module 625, the reading module 630, and the determining module 635.

The program code mentioned above may also be provided as a computer program product, for instance in the form of a data carrier carrying computer program code for performing the embodiments herein when being loaded into the wireless communication device. One such carrier may be in the form of a memory stick etc. The computer program code may furthermore be provided as pure program code on a server and downloaded to the wireless communication device.

The wireless communication device 120 may further comprise one or more memories such as the memory 216, comprising one or more memory units. The memory is arranged to be used to store obtained information, measurements, data, configurations, schedulings, and applications to perform the methods herein when being executed in the wireless communication device.

Those skilled in the art will also appreciate that the wireless communication device described above may refer to a combination of analog and digital circuits, and/or one or more processors configured with software and/or firmware, e.g. stored in the memory, that when executed by the one or more processors perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A wireless communication device configured for operation in a wireless communication network, the wireless communication device comprising:
    circuitry operative as a Digital Baseband (DB) of the wireless communication device, the DB operative to perform wireless communication over a radio link and comprising a Central Processing Unit (CPU); and
    circuitry operative as a Power Management Unit (PMU) and comprising one or more voltage regulators operative as a CPU power supply for powering the CPU;
    wherein the PMU is configured to:
        while the wireless communication device is in a normal mode of operation, detect an anomalous operating condition by either the PMU or the DB; and
        in response to detecting the anomalous operating condition:
            store diagnostic data in PMU memory, for retrieval by the DB upon a next startup of the DB, the diagnostic data comprising current operational state data for the PMU or the DB; and
            decide whether to turn off the DB in view of the anomalous operating condition; and
        in response to deciding to turn off the DB:
            store a turnoff indicator in the PMU memory indicating a turnoff reason corresponding to the decision to turn off the DB; and
            turn off the DB; and
        in response to deciding not to turn off the DB, store a suspected failure indicator in the PMU memory to indicate the detection of the anomalous operating condition by the PMU; and
    wherein the DB is configured to:
        read the PMU memory at the next startup, to determine whether the PMU memory contains the turnoff indicator or the suspected failure indicator; and
        responsive to the PMU memory containing the turnoff indicator, fetch the diagnostic data from the PMU memory, create a dump file containing the diagnostic data, and enter a debugging mode of operation in which the dump file is available for output from a debugging interface of the wireless communication device; and
        responsive to the PMU memory containing the suspected failure indicator and not containing the turnoff indicator, fetch the diagnostic data from the PMU memory and store it in DB memory for retention.

2. The wireless communication device of claim 1, wherein, with respect to deciding whether to turn off the DB in view of the anomalous operating condition, the PMU is configured to decide to turn off the DB or not turn off the DB in dependence on a defined criticality of the anomalous operating condition detected by the PMU.

3. The wireless communication device of claim 1, wherein the CPU of the DB is an application processor operative to execute one or more software applications.

4. The wireless communication device of claim 1, wherein the diagnostic data comprises at least one of: configuration register values for one or more configuration registers in the PMU or the CPU, a measured battery voltage, a measured output voltage from the one or more regulators, and one or more signal states for input or output signals of the PMU or the CPU.

5. The wireless communication device of claim 1, wherein, with respect to detecting the anomalous operating condition by either the PMU or the DB, the PMU is configured to detect at least one of the following: signaling anomalies in serial bus traffic or control signaling output from the DB, anomalies in current or voltage for the one or more voltage regulators, anomalies in voltage for a battery that powers the wireless communication device, and anomalies in an operating temperature of the wireless communication device, and anomalies in a response time of the DB with respect to one or more requests output from the PMU to the DB.

6. The wireless communication device of claim 1, wherein, with respect to detecting the anomalous operating condition by either the PMU or the DB, the PMU is configured to determine when the wireless communication device is operating in an error-handling mode of operation, to avoid interpreting an alteration in signaling or data expected from the DB to the PMU during the normal mode of operation, as indicating anomalous operation by the DB.

7. The wireless communication device of claim 1, wherein, while the wireless communication device is in the normal mode of operation and in the absence of having detected anomalous operation by the PMU or the DB, the PMU is configured to periodically store then-current diagnostic data in the PMU memory on an overwriting basis.

8. A method performed by a wireless communication device configured for operation in a wireless communication network, the method comprising:
    while the wireless communication device is in a normal mode of operation, detecting an anomalous operating condition by either a Power Management Unit (PMU) of the device or a Digital Baseband (DB) of the wireless communication device, the DB operative to perform wireless communication over a radio link and comprising a Central Processing Unit (CPU), and the PMU comprising one or more voltage regulators operative as a CPU power supply for powering the CPU; and
    in response to detecting the anomalous operating condition, the PMU:
        storing diagnostic data in PMU memory, for retrieval by the DB upon a next startup of the DB, the diagnostic data comprising current operational state data for the PMU or the DB; and
        deciding whether to turn off the DB in view of the anomalous operating condition; and
        in response to deciding to turn off the DB:
            storing a turnoff indicator in the PMU memory indicating a turnoff reason corresponding to the decision to turn off the DB; and
            shutting down the DB; and
        in response to deciding not to turn off the DB, storing a suspected failure indicator in the PMU memory to indicate the detection of the anomalous operating condition by the PMU; and the DB:
  reading the PMU memory at the next startup, to determine whether the PMU memory contains the turnoff indicator or the suspected failure indicator; and
  responsive to the PMU memory containing the turnoff indicator, fetching the diagnostic data from the PMU memory, create a dump file containing the diagnostic data, and enter a debugging mode of operation in which the dump file is available for output from a debugging interface of the wireless communication device; and
  responsive to the PMU memory containing the suspected failure indicator and not containing the turnoff indicator, fetching the diagnostic data from the PMU memory and storing it in DB memory for retention.

9. The method of claim 8, wherein, with respect to deciding whether to turn off the DB comprises the PMU deciding to turn off the DB or not turn off the DB in dependence on a defined criticality of the anomalous operating condition detected by the PMU.

10. The method of claim 8, wherein the diagnostic data comprises at least one of: configuration register values for one or more configuration registers in the PMU or the CPU, a measured battery voltage, a measured output voltage from the one or more regulators, and one or more signal states for input or output signals of the PMU or the CPU.

11. The method of claim 8, wherein, with respect to detecting the anomalous operating condition by either the PMU or the DB, the PMU detects at least one of the following: signaling anomalies in serial bus traffic or control signaling output from the DB, anomalies in current or voltage for the one or more voltage regulators, anomalies in voltage for a battery that powers the wireless communication device, and anomalies in an operating temperature of the wireless communication device, and anomalies in a response time of the DB with respect to one or more requests output from the PMU to the DB.

12. The method of claim 8, wherein, with respect to detecting the anomalous operating condition by either the PMU or the DB, the PMU determines when the wireless communication device is operating in an error-handling mode of operation, to avoid interpreting an alteration in signaling or data expected from the DB to the PMU during the normal mode of operation, as indicating anomalous operation by the DB.

13. The method of claim 8, wherein, while the wireless communication device is in the normal mode of operation and in the absence of having detected anomalous operation by the PMU or the DB, the method further includes the PMU periodically storing then-current diagnostic data in the PMU memory on an overwriting basis.

* * * * *